United States Patent

Searer et al.

[15] 3,689,681
[45] Sept. 5, 1972

[54] CONDUCTOR PROTECTING FIXTURE

[72] Inventors: Glenn V. Searer, 2509 Pleasant Plain Ave.; Vernon A. Searer, 3210 Sassafras Drive, both of Elkhart, Ind. 46514

[22] Filed: Sept. 29, 1971

[21] Appl. No.: 184,659

[52] U.S. Cl..................................174/48, 174/135
[51] Int. Cl. ..............................................H02g 3/26
[58] Field of Search...............................174/48, 135

[56] References Cited

UNITED STATES PATENTS

| | | | |
|---|---|---|---|
| 3,515,797 | 6/1970 | Hochstetler | 174/48 X |
| 3,211,825 | 10/1965 | Clos | 174/48 |
| 3,297,815 | 1/1967 | Drettmann | 174/48 |
| 3,211,824 | 10/1965 | Heiman | 174/48 |

*Primary Examiner*—Lewis H. Myers
*Assistant Examiner*—D. A. Tone
*Attorney*—Marmaduke A. Hobbs and Maurice W. Green

[57] ABSTRACT

A fixture for protecting electrical conductors installed in slots in studding of mobile homes, modular homes, trailers, and the like, in which a metal, generally U-shaped body is provided with a downwardly and rearwardly extending projection, adapted to be driven into the front of the studding beneath the slot for retaining the fixture in the slot. The fixture has a front and rear panel and a base, the rear panel being rigidly joined to the rear edge of the base and the front panel being yieldably joined to the front edge of the base. The downwardly extending spike is provided with a point and preferably with an elongated member extending rearwardly along the edge thereof. During the installation of the fixture in the slot, the spike is driven into the studding, and the front panel, which is initially positioned angularly and outwardly from the rear panel, is closed inwardly, substantially parallel with the face of the studding after the conductor or conductors have been installed in the slot within the fixture.

10 Claims, 6 Drawing Figures

PATENTED SEP 5 1972  3,689,681
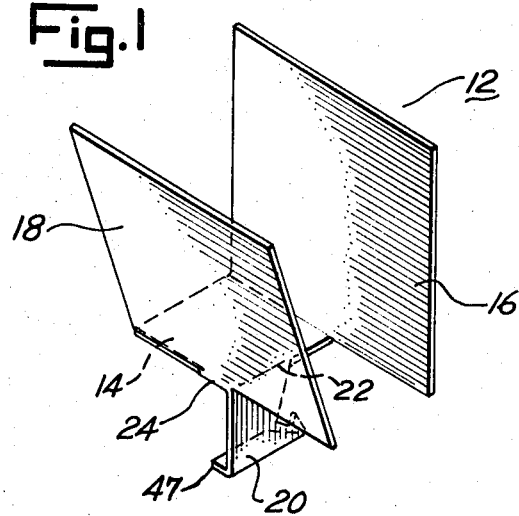
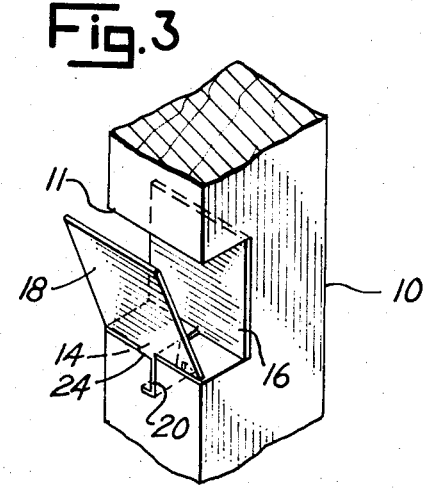
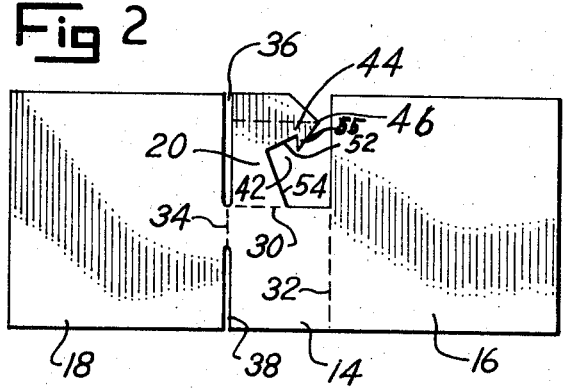
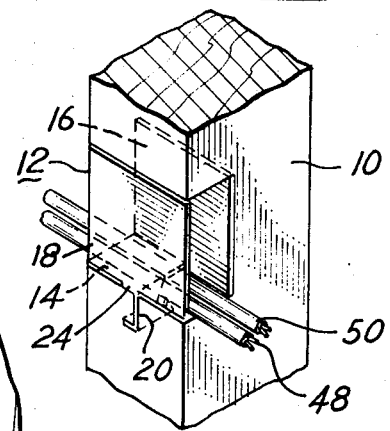
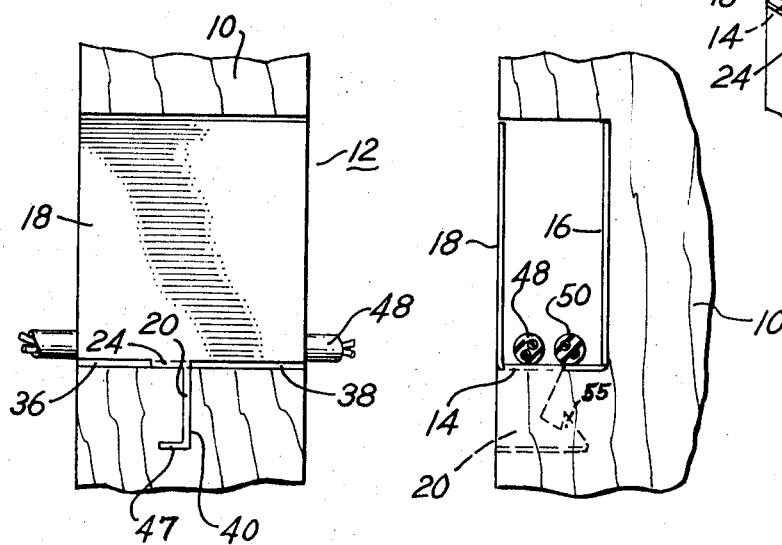
INVENTORS
GLENN SEARER &
BY VERNON A. SEARER
Hobbs & Green
ATTORNEYS

CONDUCTOR PROTECTING FIXTURE

Mobile homes, modular homes, trailers, and similar structures are usually constructed with walls of two-by-two studding, and sheeting and paneling on the outside and inside, respectively, of the studding. In this type of construction, the electrical conductors are enclosed in the wall, normally by laying the conductors in rectangular notches in one side of the studding and placing the sheeting or paneling over the notches, thus retaining the conductors in place in the wall. Nails and screws are often inserted in the wall structure after the paneling or sheeting has been applied, and since the exact location of the notches and conductors therein is not known, they may be driven or inserted into the notches and into the conductors therein, causing a short in the electrical circuit. In order to avoid damaging the conductors in the event a nail or screw is accidentally driven at a notch, metal fixtures seated in the notches and having a part extending between the conductors in the notches and the sheeting or paneling have been used. These fixtures have generally performed satisfactorily in protecting the conductors, but have often resulted in time consuming installation procedures or damage to the studding, such as splitting the studding either above or below the notches. In some types of fixtures, the front face thereof tends to protrude outwardly beyond the face of the studding, preventing the paneling or sheeting from seating firmly against the studding. It is therefore one of the principal objects of the present invention to provide a fixture for protecting electrical conductors in wall structures in which the fixture is provided with a nail-like part which is so located that the fixture can be inserted in the notch and attached to the studding with a single simple operation, and which is in a position after installation that the conductors can thereafter easily be placed in the notch and fixture.

One of the methods of attaching wire protectors of this type has involved in use of an integral spike which penetrates the side of the studding and simultaneously drives the protector in position in the precut slot in the studding. This type of protector is satisfactory for certain uses and in most places in the mobile home or trailer studding; however, in a number of applications, there is insufficient room to install the protector from the side of the studding, or inadequate room to use a hammer conveniently to drive the spike into the side of the studding and the protector into the precut slot. It is, therefore, another important object of the invention to provide a wire protector for an electrical conductor which can be installed from the face or front of the studding by inserting the protector directly into the precut slot and securing it in place with the use of an integral spike driven into the face of the studding, and which is flush with or recessed inwardly from the face of the studding when it is finally installed and closed with the conductor therein.

Another object of the invention is to provide an electrical conductor protecting fixture, which minimizes the tendency of the securing means thereof to split or otherwise damage the studding, and which gives reliable protection to the conductor and does not interfere with the installation of the sheeting or paneling.

Still another object is to provide a fixture of the aforesaid type which is simple in construction and design, and which can be fabricated economically using standard equipment with a minimum of waste in the way of scrap material.

A further object of the invention is to provide a fixture for protecting an electrical conductor enclosed in a wall, which can easily be closed without the use of any tools after the fixture has been secured in place, and the conductors thereafter inserted in the fixture.

Additional objects and advantages of the invention will become apparent from the following description and accompanying drawings, wherein:

FIG. 1 is a perspective view of a wire protector embodying the present invention;

FIG. 2 is a blank for forming the structure shown in FIG. 1, showing the construction following a single stamping operation;

FIG. 3 is a perspective view of a stud having a notch therein for an electric conductor and the present fixture installed therein in position for receiving the conductor or conductors;

FIG. 4 is a perspective view similar to that shown in FIG. 3, illustrating the position of the fixture after a pair of conductors have been inserted in the notch;

FIG. 5 is an elevational view of a stud and the present fixture, showing the conductors installed in the fixture; and FIG. 6 is a fragmentary side elevational view of the stud and the present fixture installed in a precut notch in the stud, showing the conductors installed in the fixture.

Referring more specifically to the drawings, numeral 10 indicates generally a stud forming a structural element of a wall in a building structure, such as a mobile or modular home or trailer, the wall normally consisting of a series of spaced vertically arranged studding on which sheeting is attached to the external surface and paneling attached to the internal surface. Notches 11 in the studding extending parallel with the sheeting and paneling, normally on the side next to the external sheeting, are used to receive electrical conductors strung along the spaced studding. These notches are normally precut and are the same size in all of the studs.

The present fixture 12 consists of a base 14, a rear panel 16 joined integrally to the base, a front panel 18, and a securing means 20 extending vertically downwardly from the base and joined integrally thereto at a bend 22. The front panel is joined to the base by a number 24, connected integrally to the panel and the base, and forming in effect a hinge which permits the front panel to be easily pivoted inwardly from the position shown in FIG. 3 to the position shown in FIG. 4.

A fixture is stamped from sheet or plate metal, preferably steel, the blank after the first stamping operation being shown in FIG. 2. In the next step the two panels are bent upwardly to form a generally U-shaped configuration. The numerals corresponding to the various parts shown in FIG. 1 are used in identifying the corresponding parts in FIG. 2. One of the advantages of the present fixture is the small amount of scrap material produced in the fabrication of the fixture, thus contributing to an economical, low cost fixture. The broken lines 30, 32 and 34 represent fold lines between the base 14 and member 20, rear panel 16, and front panel 18.

In order to permit the front panel to be pivoted inwardly from the position shown in FIG. 3 to the position shown in FIG. 4, the connecting portion 24 is relatively narrow, and the size is determined by the length of slots 36 and 38 extending inwardly from opposite sides of the blank.

A securing means 20 consists of a downwardly extending member 40 of the thickness of sheet or plate metal forming the base and extends inwardly over half the distance from the front panel to the rear panel. The member 40 has a notch 42, which, in part, is defined by a spike-like member 44, preferably having a pointed end 46 for penetrating the wood of the studding below slot 11. In order to assist in retaining the fixture in the precut slot in the studding, particularly while the front panel is being moved from its open position illustrated in FIG. 3 to its closed position illustrated in FIG. 4, a laterally extending elongated rib 47 is preferably provided at the lower end of member 40. When the securing means has been driven into place in the wood beneath the notch, the rib interlocks with the wooden fibers and prevents tilting of the fixture when it is being manipulated to close the front panel in the installation of the conductors 48 and 50. This rib is particularly useful in the event the front panel must be opened from the position shown in FIG. 4 to the position shown in FIG. 3, to add to or remove conductors from slot 11. The V-shaped edges 52 and 54 of notch 42 and hook 55 likewise tend to secure the fixture firmly in place after the securing means 20 has been driven into the stud beneath notch 11. The rear panel 16 is rigidly secured to base 22 and remains in the right angle position shown in the drawings, both before, during and after installation.

In the operation and use of the present fixture, the fixture is placed in front of the precut notch 11, and the securing member 20 is driven inwardly into the wood beneath the notch with a hammer. As the securing means is driven inwardly, the rear panel and base are seated on the rear side and the bottom of the notch, with the front panel positioned angularly outwardly, as illustrated in FIGS. 1 and 3. The conductors 48 and 50 are inserted in the slot through the space between the upper edge of front panel 18 and the upper front edge of notch 11, and are dropped downwardly, thus seating them on the upper surface of base 14 within the notch. The front panel is then pressed inwardly from the position shown in FIG. 3 to the position shown in FIGS. 4 and 6, completely closing the notch, and forming an effective shield to prevent the penetration of nails, screws, or the like, into the conductors strung through the slot. As can readily be seen from FIG. 6, after installation of the fixture in the slot and with the front panel closed, the outer surface of the front panel does not protrude beyond the adjacent front surfaces of the stud. While it is preferred that the outer surface of the front panel and the front surfaces of the stud be on the same plane, the fixture may be recessed slightly inwardly. With this construction, no bump or other unevenness is created in the sheeting attached to the studding over the fixture.

One of the particular advantages of the present fixture is the ease with which it can be installed, regardless of the close proximity of other studding and wall structure. Since the fixture is mounted in the precut slot from the front, the studding can be in close proximity to one another, and a series of the fixtures can be used in the event there are several studding placed in juxtaposition to one another. The fixture with the type of securing means 20 illustrated in the drawings can be installed firmly in place, where it will remain without accidental removal during the installation of the conductors. Further, neither the securing means, base, nor panels cause any appreciable damage to the studding which might result in splitting or breakage of the studding during or after the installation. The front panel 18 can be bent from the position illustrated in FIG. 3 to the position shown in FIG. 4 by merely pressing the front panel inwardly to its closed position without the use of any tools, thus facilitating rapid installation of the conductors in the wall within the fixture during the construction of a mobile or modular home or other building structure.

If a nail or screw is driven through the paneling after the conductors have been installed in the foregoing manner, they are stopped or deflected away from the conductors so that the conductors are not damaged by any accidental placing of the nails or screws in the wall notches. While the front panel 18 may be forced inwardly at the top by the nail or screw, the connecting portion 24 retains the lower portion of the panel in its spaced relationship with respect to the rear panel and the conductors, and provides adequate protection within the fixture to prevent damage to the insulation of the electrical conductors.

While only one embodiment of the present fixture for protecting electrical conductors has been described in detail herein, various changes and modifications may be made without departing from the scope of the invention.

We claim:

1. A fixture for protecting electrical conductors installed in a studding notch, comprising a base section having front and rear edges, a rear panel rigidly connected to the rear edge of said base, a front panel, a means yieldably connecting said front panel to the front edge of said base permitting said front panel to be moved angularly inwardly with respect to said base, a means extending downwardly from said base and projecting rearwardly for penetrating the studding below the notch and retaining the fixture therein.

2. A fixture for protecting electrical conductors as defined in claim 1 in which the rear end of the penetrating means is pointed and the front end of the penetrating means is on the same plane as the front edge of said base.

3. A fixture for protecting electrical conductors as defined in claim 1 in which said downwardly extending means has a laterally extending portion elongated from front to rear along said means.

4. A fixture for protecting electrical conductors as defined in Claim 1 in which said downwardly extending means is joined integrally with the base near the center thereof and projects downwardly at right angles with respect thereto.

5. A fixture for protecting electrical conductors as defined in Claim 4 in which said downwardly extending means has a laterally extending portion elongated from front to rear along said means.

6. A fixture for protecting electrical conductors as defined in claim 4, in which said downwardly extending means is relatively broad from front to rear and relatively thin laterally and contains a rearwardly extending spike-like member near its bottom edge at the lower portion thereof.

7. A fixture for protecting electrical conductors as defined in claim 6 in which said spike-like member includes a hook-shaped part near the pointed end thereof.

8. A fixture for protecting electrical conductors as defined in claim 1 in which said means yieldably connecting said front panel to the front edge of said base consists of a relatively narrow piece of material joined integrally to said panel and base and being spaced inwardly from the two lateral edges of said front panel.

9. A fixture for protecting electrical conductors as defined in claim 8 in which said downwardly extending means is joined integrally with the base near the center thereof and projects downwardly at right angles with respect thereto.

10. A fixture for protecting electrical conductors as defined in claim 1 in which said last mentioned means includes a hook-shaped part near the penetrating end thereof.

* * * * *